March 10, 1970 J. A. ELLSWORTH 3,500,416

PROXIMITY SWITCHING DEVICE

Filed June 14, 1966

INVENTOR.
JAMES A. ELLSWORTH
BY John E. Reilly
ATTORNEY

United States Patent Office 3,500,416
Patented Mar. 10, 1970

3,500,416
PROXIMITY SWITCHING DEVICE

James A. Ellsworth, 3833 Wilkes Ave., Davenport, Iowa 52806

Filed June 14, 1966, Ser. No. 558,544
Int. Cl. H04b 7/00
U.S. Cl. 343—225 9 Claims

ABSTRACT OF THE DISCLOSURE

A highly sensitive superregenerative detector has a high Q tank circuit loaded by a remote actuator in the form of an external equally sensitive tank circuit which is either electromagnetically or capacitively coupled to the detector whereby to effect close accurate control over the output characteristics of the detector.

This invention relates to novel and improved electronic switching devices, and more particularly relates to the cooperative disposition and relation between a switching unit incorporating a superregenerative detector and a remote actuator for selectively controlling the output characteristics of the detector and the ON-OFF conditions of a switching circuit.

In electronic remote control devices it is known to employ a superregenerative detector as part of the receiver and which in response to a predetermined frequency is energized to actuate a switch relay or switching circuit. Essentially the superregenerative detector generates radio frequency oscillations which reoccur periodically and at a rate per second known as the quench frequency. The radio frequency oscillations are in the form of a sine wave whose frequency may be determined by the inductance-capacitance value of a parallel resonant tank circuit in the detector; however, the quench voltage wave form is determined by other resistance-capacitance time constants in the circuit and thus may be at a frequency substantially lower than the radio frequency oscillations.

In the absence of an applied singal from an external source, such as, an AM radio signal, the exact starting point of buildup in each quench cycle of the higher radio frequency oscillations will vary randomly with the noise voltages in the radio-frequency circuit. As the radio frequency oscillations start, their initial amplitude will correspond to the amplitude of the noise voltages in the circuit and reach a maximum value corresponding to the equilibrium value for the oscillator. The oscillations then die out as the quench voltage again becomes too small to support the higher radio frequency oscillations. When a constant amplitude signal from an external source is superimposed upon the circuit at the frequency of the tank circuit and is larger in amplitude than the thermal or other agitation noises in the tuned detector circuit, it will have the effect of "quieting" or suppressing the random noise voltages in the circuit specifically by causing the radio frequency oscillations in the detector circuit to start at the same point on each quench cycle and yield a constant DC voltage output from the detector; whereas noise voltages in the tank circuit or amplitude modulated signals applied from an external source will yield an amplitude varying voltage output from the detector. In accordance with the present invention, it has been found that a superregenerative detector circuit can be modified to include an extremely sensitive tank circuit characterized by its high efficiency and low loss characteristics and its ability to respond to a narrow band of radio frequency energy, and in combination therewith to control the output charatceristics of the detector within the selected frequency band by means of a remote actuator unit which is characterized by being completely passive, that is, requiring no batteries or other power source or switch, as well as being codeable within a narrow frequency range so as to prevent cross-operation between non-respective detector and remote actuator units. Thus, the switching device combined the advantages of being very simple and compact, completely passive and enabling close coding or tuning of a number of switching devices at different selective frequencies. In this relation, amplitude modulated signals, although varying the characteristics of the detector, will have much the same effect as random noise voltages in the circuit so that the output characteristics of the detector may be modified to achieve switching action only through a constant amplitude signal or absorption device tuned to resonate within the selected frequency range.

It is therefore an object of the present invention to provide a proximity switching device incorporating therein a modified superregenerative detector and to utilize in combination therewith a remote actuator which is characterized by being extremely accurate and highly effective in controlling the output characteristics of the detector; further wherein the remote actuator is completely passive and contains no active elements, such as, a power source, tubes, transistors, or other voltage or current amplifying devices, and further requires no direct electrical coupling to the detector circuit.

Another object of the present invention is to provide a proximity switching device being readily conformable for use in various electrical control applications and specifically in applications requiring close control over the state of a switching circuit and at a selected distance of operation therefrom.

It is a further object of the present invention to provide a remote actuator in combination with a modified superregenerative detector for the purpose of functioning as a proximity switching device and in which the actuator and detector units can be tuned for selective switching within a narrow radio frequency range.

It is an additional object of the present invention to make provision for a modified highly sensitive superregenerative detector which is loaded by an external, equally sensitive tank circuit being electro-magnetically or capacitively coupled to the detector whereby to achieve close, accurate control over the output characteristics of the detector.

The above and other objects, advantages and features of the present invention will become more readily understood and appreciated from a consideration of the following detailed description of different forms of the present invention when taken together with the accompanying drawings, in which.

Figures 1, 2, 3:
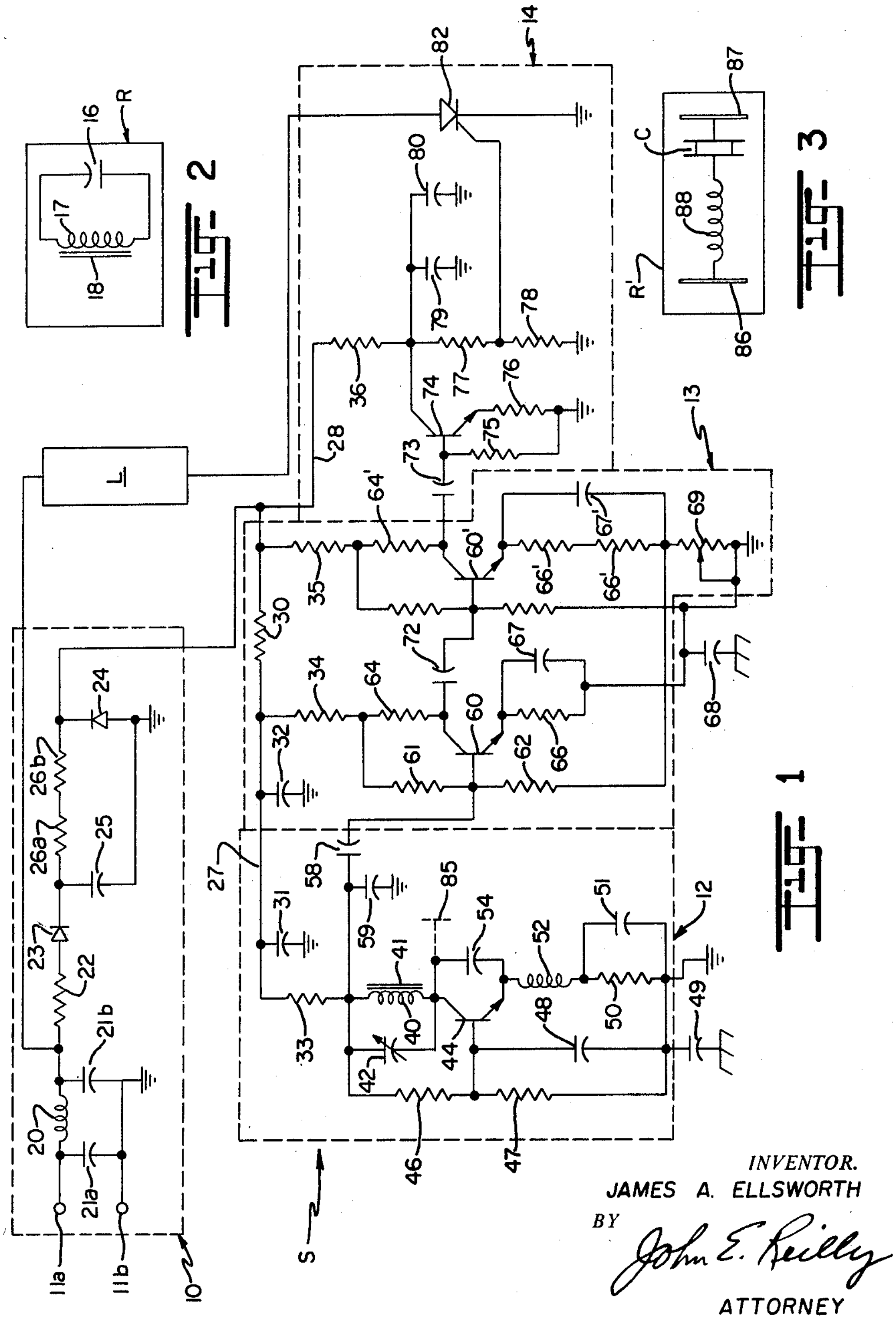
FIG. 1 is a circuit diagram of a switching unit incorporating a modified superregenerative detector in accordance with the present invention.
FIG. 2 is a schematic view of a remote actuator for electro-magnetic coupling to the unit shown in FIG. 1.
FIG. 3 is a schematic view of an alternate form of remote actuator for capacitive coupling to an alternate form of unit and as shown in FIG. 1.

Referring in more detail to the drawings, the present invention may be described by way of illustrative example as an electronic proximity switching device adapted to control locking and unlocking of a cash register, safe or the like, by remote actuation. It is to be understood at the outset that its described application for use in a locking arrangement is given by way of illustration only and not limitation; and by virtue of its simplicity but extreme sensitivity in operation, is conformable for use in numerous other applications as will be readily appreciated by those skilled in the art. More specifically referring to its use as a switching device to control locking and unlocking of a cash register, the locking member is generally represented by the load L which, although not shown, may conventionally take the form of a solenoid or relay installed in the cash register. In turn, the switching units are broadly comprised of a power supply circuit 10 connected through terminals 11*a* and 11*b* to a source of alternating current. The power supply has its output connected to the collector sides of a modified superregenerative detector circuit 12, a two-stage noise amplifier 13, and a switching circuit 14. In the relation shown, the detector circuit is coupled to the noise amplifier circuit 13 which in turn drives the switching circuit 14 to energize or deenergize the load L. The entire switching unit is sufficiently compact that it may be encapsulated within a very small block or casing and installed in the cash register or otherwise mounted in direct association with the load L.

The remote actuator shown in FIGURE 2 takes the form of an L–C tank circuit including a capacitor 16 connected across an inductance coil 17 which is wound on a core material represented at 18. Here the core 18 is composed of a material which is capable of operating at high frequencies with low loss and narrow band width; that is, the core is of a very high Q material, such as, a high frequency ferrite core and with the appropriate amount of capacitance being connected across the coil 17 to tune the tank circuit to a frequency corresponding to that of a tank circuit in the detector 12. Moreover, the remote actuator may be sized such that it can be carried in a pocket or conveniently attached to the user so as to permit the user to selectively unlock the cash register merely by bringing the remote actuator in proximity to the switching unit 10, for example, within a selected distance of one to four feet.

Now considering in more detail the construction and arrangement of the form of switching unit shown in FIGURE 1, the power supply circuit includes a line interference filter at the terminals 11*a* and 11*b* and which filter is made of an inductance 20 and capacitors 21*a* and 21*b*. From the filter the alternating current is applied through a line dropping resistor 22 and power supply rectifier diode 23, then through a power supply regulator having a Zener diode 24 connected in series with voltage dropping resistors 26*a* and 26*b* and power supply filter or capacitor 25 connected from the output of diode 23 to ground. As a result, the alternating current source is converted to a regulated source of DC voltage for the various circuits; and as shown, the output from the power supply circuit is connected through line 27 to the detector circuit 12 and amplifier circuit block 13, and through separate line 28 to the switching circuit 14. Line 27 contains a DC supply voltage de-coupling resistor 30 as well as decoupling capacitors 31 and 32. In addition, collector load resistors 33, 34 and 35 are connected between the line 27 and the junction terminals into the collector sides of the detector circuit 12 and the first and second stage amplifier circuits in the amplifier circuits 13, respectively. Similarly, a collector load resistor 36 is contained in line 28 leading to the collector side of the switching circuit 14.

In accordance with the present invention, the detector circuit includes an improved form of superregenerative detector which has been devised to incorporate an extremely high Q, L–C tank circuit corresponding in frequency to that of the tank circuit in the remote actuator and which is characterized by being extremely sensitive to the absorption effect of the remote actuator within a narrow band width. Specifically, the tank circuit is defined by an inductance coil 40 wound on a core represented at 41 of a very high Q material with a capacitor 42 connected across the coil to tune the tank circuit to the desired frequency. In addition, the coil is arranged in series with the resistor 33 from the power supply circuit for connection at the collector side of the superregenerative detector transistor 44. The base of the transistor is connected to the common junction terminal of resistors 46 and 47 with a by-pass connection to ground including capacitor 48; also, capacitor 49 serves as a by-pass capacitor between the circuit ground and the base. In turn the line containing resistor 46 is coupled to the two-stage amplifier block 13 through the junction terminal between the resistor 33 and tank circuit 40 with a coupling capacitor 58 located in the detected output line between the terminal and the amplifier circuit. In the detector circuit the quench voltage wave form of the transistor 44 is determined by the R–C time constants selected for resistor 50 and capacitor 51 connected to choke 52 at the emitter side of the transistor.

In the absence of the absorption effect from the remote actuator, the detected output will result either from random signals or noise voltages together with the quench voltage present; however the quench voltage waveform may be effectively filtered out with shunt capacity to ground through a capacitor 59 in the detected output without removing any appreciable amount of the lower frequency noise voltages or extraneous amplitude modulated signals superimposed on the field of the tank circuit.

In the first amplifier stage, transistor 60 has its base connected to the junction terminal of biasing and negative feedback resistors 61 and 62, the resistor 61 being connected to the junction between the resistor 34 and a series-connected collective load resistor 64 and the lower potential side of the resistor 62 is connected to the emitter side of the second stage amplifier. The emitter side of the first stage amplifier has a resistor 66 and a by-pass capacitor 67 then is returned to ground, and a by-pass capacitor 68 is shown connected between circuit ground and the case to provide shielding action from stray signals. In the second amplifier stage like elements are correspondingly designated by prime numbers with the further addition of a variable emitter resistor 69 for gain adjustment.

A coupling capacitor 72 is connected between the collector side of the first amplifier stage 60 and the base junction terminal of the second amplifier stage 60′, and in turn the second stage amplifier has its output at the collector side applied through a coupling capacitor 73 to the base side of the detector transistor 74 in the switching circuit 14. The base side of the transistor 74 has a base return resistor 75 and the emitter side a resistor 76, both resistors 75 and 76 being connected to ground. The output from the collector side of the transistor is connected to the junction terminal between the resistor 36 and series-connected voltage dividing resistors 77 and 78, as well as noise filter capacitors 79 and 80. In the form shown in FIGURE 1, the gating connection of a silicon controlled rectifier 82, which defines the final load switching element in the circuit, is connected between the voltage dividing resistors 77 and 78. Thus, the rectifier diode 82 will receive a fixed "on" or forward bias voltage from the power supply circuit, unless the fixed bias voltage is cancelled out by the detected noise output of the superregenertaive detector circuit 12. Generally, in the circuitry described the detected noise output is therefore amplified and converted to a DC voltage level, and the resultant voltage level is then amplified and applied as an "off" bias voltage to overcome or cancel out the fixed "on" bias voltage, thereby causing the circuit to change from a state of conduction to one of cut-off. In this connection, a solid state or silicon controlled rectifier is illustrated as part of the switching circuit although it will be evident that other switching means may be employed and be controlled by the detector circuit.

The tank circuits in the remote actuator and switching unit are tuned to resonate at precisely the same frequency. Again the nature of the superregenerative detector is such that it performs essentially as an oscillator to radiate a very weak electric or electro-magnetic field and which is alternated between an oscillating and a non-oscillating condition at a low radio frequency rate, referred to as the quench frequency. In the absence of the absorption effect from the remote actuator or other constant amplitude signal at the frequency selected, the higher radio frequency oscillations starting point on the build-up of each quench cycle will vary randomly with the noise voltages in the tuned radio frequency tank circuit, and the detected noise output voltage is amplified and converted to a DC voltage level as described with the quench voltage being removed with shunt capacity to ground at the output of the detector circuit. The detected noise output voltage is then applied as an "off" bias voltage to overcome the constant fixed "on" bias voltage of the power supply circuit, and, since the detector output noise is ever-present in the absence of the remote actuator, the net result is that the switching circuit is normally non-conducting. Whenever the remote actuator is brought into proximity or within operating distance of the switching unit it will cause, by virtue of its slight loading or suppressing effect on the detector tank circuit, the radio frequency oscillations to start at virtually the same point on each detector quench cycle. This in turn causes the absence of any variation in the detector output voltage, as opposed to a random noise variation out of the detector, whereupon the fixed "on" bias voltage applied by the power supply circuit will activate the diode to energize the load L.

Coding or tuning of the proximity switching device to prevent cross-operation between non-respective sensors and remote actuators may be effected by tuning each device to a different selected radio frequency and a wide range of selection is afforded by utilizing high Q tank circuits. In addition, several switching devices tuned to the same frequency and in the same vicinity are capable of being activated in unison by a single remote actuator tuned to that frequency. This takes place since each detector radiates a very low power radio frequency signal modulated with noise and which when quieted behaves as an unmodulated radio frequency radiator to quiet the other detectors. Further, coding can be achieved by operating two or more superregenerative detectors at different frequencies in a single sensor unit with two or more associated tank circuits in a single remote actuator.

In the foregoing coupling between the remote actuator R and the detector circuit in the sensor unit is essentially electro-magnetic, as in radio wave propagation, although at very close ranges this coupling will resolve into almost purely mangetic coupling. Moreover, the same effect may be accomplished electro-mechanically through the use of a piezo-electric crystal C in a modified form of actuator $R^1$ as shown in FIGURE 3. Again the piezo-electric crystal is in the form of a very high Q device possessed of a very narrow band width and which will stress mechanically when an electrical voltage is applied thereacross. Conversely the crystal will create an electrical voltage if stressed mechanically and may be broadly characterized as an electro-mechanical high Q tank circuit or resonator. Specifically, coupling is achieved capacitively between a capacitor plate 85 situated on the detector circuit, as shown dotted in FIGURE 1, and a second capacitor plate 86 in the actuator $R^1$ whereby a radio frequency field is established between the plates. In addition, a third capacitor plate 87 is attached to the other side of the crystal and provides a return path for the radio frequency currents involved by means of body capacity or other metal objects. Moreover a small inductor or coil 88 may be inserted between one of the capacitor plates in the remote actuator and one side of the crystal to approach series resonant circuit conditions whereby to create a lower impedence path for the radio frequency currents and increase the operating range of the device. In this relation, the piezo-electric method of remote loading allows almost complete shielding of the detector portion of the unit against spurious operation due to radio signals of the same channel or frequency.

It will be evident from the foregoing that various arrangements of the disclosed invention are possible, such as, the use of tubes instead of semi-conductor circuits or different semi-conductor components that would accomplish the same net results, various concepts of amplifier circuits following the detector circuit described above, and also various types of switches, circuit board arrangements and numerous different packaging concepts. In either form of invention, it will be seen that the modified superregenerative detector as herein set forth and described can be loaded or "quieted" by a remote, high Q tank circuit either electro-magnetically or capacitively coupled to the detector circuit, and in either form, the quieting effect is utilized to accomplish the desired switching action within the selected frequency range. Still further, in either form the remote actuator is completely passive requiring no battery, power source or switch mechanism.

What is claimed is:

1. An electronic switching device comprising in combination a switching circuit, a power source for applying a fixed bias voltage to said switching circuit, a superregenerative detector including a first high Q tank circuit being tuned to resonate at a predetermined frequency, voltage applying means for converting the noise output voltage of said detector to a DC voltage and applying same to said switching circuit at a level opposing the fixed bias voltage from said power source, and a remote actuator having a second tank circuit tuned to resonate at a predetermined frequency of said first tank circuit, said second tank circuit being operative to suppress the detected output noise voltage from said detector and prevent application of the detector noise voltage from said detector to said switching circuit.

2. An electronic switching circuit according to claim 1 wherein the fixed bias voltage is operative to hold said switching circuit in a conductive state in the absence of the voltage applied from said detector.

3. An electronic switching circuit according to claim 1, said voltage applying means being defined by first and second stage noise amplifiers, and a detector in said switching circuit coupled to said second stage amplifier.

4. An electronic switching circuit according to claim 3, said power source defining a common DC voltage source to the collector sides of said superregenerative detector, to said first and second stage amplifiers and to the detector in said switching circuit.

5. In an electronic switching device having a switching circuit and a power source for applying a fixed bias voltage to said switching circuit, the combination therewith of a superregenerative detector including a first high Q tank circuit being tuned to resonate at a predetermined frequency, voltage applying means coupled to said superregenerative detector for driving said switching circuit in response to noise output voltages from said detector at a level opposing the bias voltage from said power source, and a remote actuator having a second high Q tank circuit being tuned to resonate at the predetermined frequency level of said first tank circuit, said second tank circuit when superimposed on the field of said first tank circuit being operative to suppress the output noise voltage from said detector and prevent application of a voltage to said switching circuit opposing the fixed bias voltage.

6. In an electronic switching device according to claim 5, said remote actuator being characterized by consisting of a second tank circuit tuned to the frequency of the first tank circuit and said second tank circuit being electro-magnetically coupled to the field of said first tank circuit at a predetermined distance therefrom to suppress the detected output noise voltages.

7. In an electronic switching device according to claim 5, said remote actuator being defined by a second tank circuit being capacitively coupled to the field of said first tank circuit at a predetermined distance therefrom to suppress the detected noise output voltages.

8. In an electronic control circuit having a switching circuit and a power source for applying a fixed bias voltage to said switching circuit, a superregenerative detector including a high Q tank circuit sensitive to noise voltages in the detector to generate a detected noise output voltage and having a capacitor plate associated with said tank circuit, voltage applying means coupled to said super-regenerative detector for driving said switching circuit in response to noise output voltages from said detector at a level opposing the bias voltage from said power source, and a remote actuator defining a resonant absorption device defined by spaced capacitor plates and a piezo-electric crystal between said plates tuned to resonate at a frequency corresponding to the resonant frequency of said tank circuit, said remote actuator being movable into the field of said tank circuit to suppress the detected noise voltages in said detector with one of said capacitor plates in said remote actuator being capacitively coupled to the capacitor plate in said tank circuit to establish a radio frequency field therebetween.

9. In an electronic control circuit according to claim 8, said remote actuator further including an inductance coil between said crystal and one of said spaced capacitor plates.

References Cited

UNITED STATES PATENTS

| | | | |
|---|---|---|---|
| 2,511,409 | 6/1950 | Mayberry | 325—8 |
| 3,142,166 | 7/1964 | Adam et al. | 340—171 |
| 3,374,787 | 3/1968 | Hatke | 325—118 |

JOHN W. CALDWELL, Primary Examiner

M. M. CURTIS, Assistant Examiner

U.S. Cl. X.R.

325—29; 340—171; 343—228